(12) United States Patent
Davydov

(10) Patent No.: US 10,554,329 B2
(45) Date of Patent: Feb. 4, 2020

(54) GRANT-LESS PUSCH UPLINK

(71) Applicant: INTEL CORPORATION, Santa Clara, CA (US)

(72) Inventor: Alexei Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/750,121

(22) PCT Filed: Dec. 24, 2015

(86) PCT No.: PCT/US2015/000339
§ 371 (c)(1),
(2) Date: Feb. 2, 2018

(87) PCT Pub. No.: WO2017/039564
PCT Pub. Date: Mar. 9, 2017

(65) Prior Publication Data
US 2018/0167161 A1    Jun. 14, 2018

Related U.S. Application Data

(60) Provisional application No. 62/214,414, filed on Sep. 4, 2015.

(51) Int. Cl.
*H04W 4/00* (2018.01)
*H04L 1/00* (2006.01)
(Continued)

(52) U.S. Cl.
CPC .......... *H04L 1/0011* (2013.01); *H04L 1/0005* (2013.01); *H04L 1/1812* (2013.01); *H04L 5/0051* (2013.01)

(58) Field of Classification Search
None
See application file for complete search history.

(56) References Cited

U.S. PATENT DOCUMENTS

| 2011/0078531 A1* | 3/2011 | Umeda | H04L 1/0016 |
| | | | 714/751 |
| 2012/0069768 A1* | 3/2012 | Ghassemzadeh | H04B 7/061 |
| | | | 370/252 |

(Continued)

FOREIGN PATENT DOCUMENTS

WO    2014/090200 A1    6/2014

OTHER PUBLICATIONS

International Search Report and Written Opinion for International Patent Application No. PCT/US2015/000339 dated Aug. 2, 2016; 16 pages.

(Continued)

*Primary Examiner* — Clemence S Han
(74) *Attorney, Agent, or Firm* — Fish & Richardson P.C.

(57) ABSTRACT

Methods and apparatuses for communicating in a cellular communications network, including provision of a user equipment comprising processing circuitry to: replace one or more transmission parameters from which a further transmission parameter may be determined with one or more corresponding virtual transmission parameters to provide one or more replacement transmission parameters from which a modified further transmission parameter may be determined; determine the modified further transmission parameter based on the one or more replacement transmission parameters; and transmit a signal using the modified further transmission parameter.

20 Claims, 8 Drawing Sheets

(51) Int. Cl.
*H04L 5/00* (2006.01)
*H04L 1/18* (2006.01)

(56) References Cited

U.S. PATENT DOCUMENTS

| | | | | |
|---|---|---|---|---|
| 2013/0022012 A1* | 1/2013 | Lee | ........... | H04W 52/0216 370/329 |
| 2013/0028219 A1* | 1/2013 | Lee | ........... | H04L 5/0053 370/329 |
| 2013/0034071 A1* | 2/2013 | Lee | ........... | H04W 74/0866 370/329 |
| 2015/0195854 A1* | 7/2015 | Zhu | ........... | H04W 74/08 370/329 |
| 2015/0245326 A1* | 8/2015 | Rune | ........... | H04L 1/0003 370/329 |
| 2016/0338112 A1* | 11/2016 | Lee | ........... | H04W 76/27 |
| 2016/0366704 A1* | 12/2016 | Lee | ........... | H04W 72/0413 |
| 2017/0013610 A1* | 1/2017 | Lee | ........... | H04L 1/00 |
| 2017/0215201 A1* | 7/2017 | Kim | ........... | H04L 27/26 |
| 2018/0034608 A1* | 2/2018 | Seo | ........... | H04L 5/00 |
| 2018/0288790 A1* | 10/2018 | Kim | ........... | H04W 72/1278 |

OTHER PUBLICATIONS

3GPP TS 36.213 V12.7.0 (Oct. 2015) "LTE; Evolved Universal Terrestrial Radio Access (E-UTRA); Physical layer procedures (Release 12)", 243 pages.

\* cited by examiner

GRANT-LESS PUSCH UPLINK

CROSS REFERENCE TO RELATED APPLICATIONS

The present application is a national phase entry under 35 U.S.C. § 371 of International Application No. PCT/US2015/000339, filed Dec. 24, 2015, entitled "GRANT-LESS PUSCH UPLINK", which claims priority from U.S. Provisional Patent Application No. 62/214,414, filed Sep. 4, 2015, and entitled "LOW LATENCY UPLINK NON-ORTHOGONAL ACCESS VIA CHANNEL CODING SPREADING AND LINK ADAPTATION", the entire disclosures of which are hereby incorporated by reference in their entireties.

TECHNICAL FIELD

Configurations relate to wireless communications, and more particularly, to grant-less Physical Uplink Shared Channel (PUSCH) uplinks.

BACKGROUND

Ever greater demand is placed on telecommunication services, which are to accommodate increasingly more efficient and effective communication for increasing numbers of fixed and mobile devices.

Latency incurred in respect of transmissions is a critical limiting factor, and it is therefore desirable to reduce latency in a telecommunications network.

BRIEF DESCRIPTION

Configurations described herein are illustrated, without limitation, by way of example, in the accompanying drawings.

DETAILED DESCRIPTION

Figure 1:
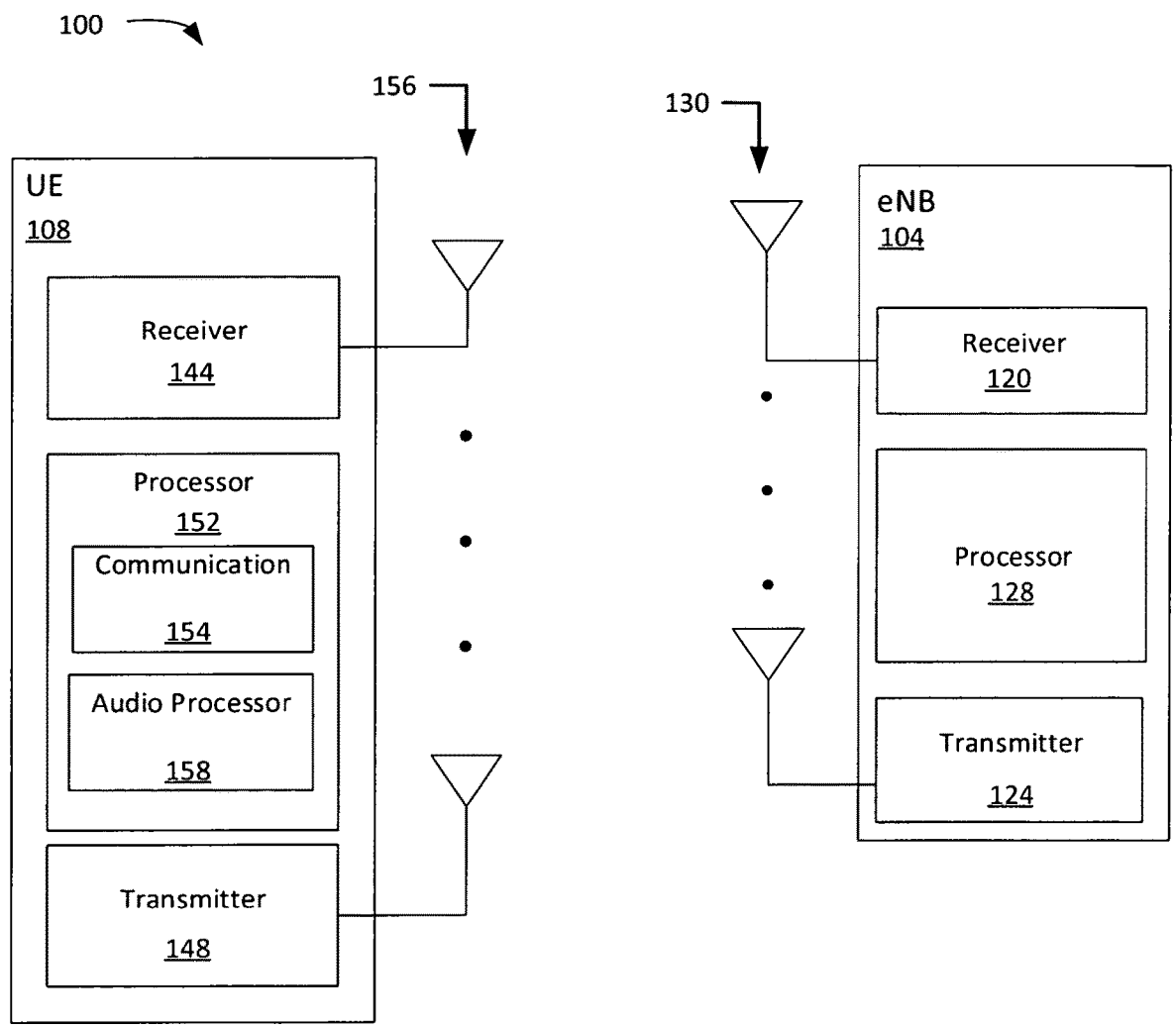
FIG. 1 shows an example of a user equipment and Evolved Node B (eNB)

Illustrative configurations include, but are not limited to, methods, systems, and apparatuses for transmitting a grant-less Physical Uplink Shared Channel (PUSCH) uplink.

Various aspects of the illustrative configurations are described using terms commonly employed by those skilled in the art to convey the substance of their work to others skilled in the art. However, it will be apparent to those skilled in the art that some alternate configurations may be practiced using with portions of the described aspects. For purposes of explanation, specific numbers, materials, and configurations are set forth in order to provide a thorough understanding of the illustrative configurations. However, it will be apparent to one skilled in the art that alternate configurations may be practiced without the specific details. In other instances, well-known features are omitted or simplified in order to not obscure the illustrative configurations.

Further, various operations will be described as multiple discrete operations, in turn, in a manner that is most helpful in understanding the illustrative configurations; however, the order of description should not be construed as to imply that these operations are necessarily order dependent. In particular, these operations need not be performed in the order of presentation.

The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific configurations have been illustrated and described herein, it will be appreciated by those of ordinary skill in the art that a wide variety of alternate and/or equivalent implementations may be substituted for the specific configurations shown and described. This application is intended to cover any adaptations or variations of the configurations discussed herein.

As used herein, the term "logic" and/or "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some configurations, the circuitry may be implemented in, or functions associated with the circuitry may be implemented by, one or more software or firmware modules. In some configurations, circuitry may include logic, at least partially operable in hardware.

There is disclosed a user equipment for use in a cellular communications network, the user equipment comprising processing circuitry to: replace one or more transmission parameters from which a further transmission parameter may be determined with one or more corresponding virtual transmission parameters to provide one or more replacement transmission parameters from which a modified further transmission parameter may be determined; determine the modified further transmission parameter based on the one or more replacement transmission parameters; and transmit a signal as a grant-less PUSCH uplink using the modified further transmission parameter.

Employing a grant-less PUSCH uplink reduces latency by obviating the latency incurred by obtaining a PUSCH uplink scheduling grant. Replacing one or more of the transmission parameters with a virtual transmission parameter facilitates increasing the robustness of such a grant-less PUSCH uplink without unduly departing from existing network infrastructure and specifications.

The further transmission parameter may be transmission coding rate. Transmission coding rate is a critical factor in determining robustness of an uplink.

The transmission coding rate may be determined based on a transmission block size, which in turn may be determined from the one or more replacement transmission parameters. This arrangement facilitates increased robustness of a grant-less PUSCH uplink with reduced departure from existing network infrastructure and specifications.

The one or more virtual transmission parameters may be determined by adding and/or multiplying one or more of the transmission parameters and one or more transmission parameter modifiers. This facilitates a high degree of flexibility in terms of modifying the transmission parameters.

One of the one or more transmission parameters may be the number of resource blocks; and the corresponding virtual parameter may be a virtual number of resource blocks. This arrangement facilitates increased robustness of a grant-less PUSCH uplink with reduced departure from existing network infrastructure and specifications.

The virtual number of resource blocks may be determined by taking the product of the number of resource blocks and a resource blocks multiplier and rounding to the nearest integer.

More than one transmission parameter may be replaced. This facilitates a greater increase in robustness of a grant-less PUSCH uplink.

There may be processing circuitry to: receive a control signal; and decode from the received control signal the one or more transmission parameters. Thus the transmission parameters sent from existing network infrastructure can be modified by the user equipment to increase robustness of a grant-less PUSCH uplink.

There may be processing circuitry to: receive Hybrid Automatic Repeat Request (HARQ) responses, wherein: the one or more of the virtual transmission parameters are determined based on the received HARQ responses. This facilitates network control over the modifying of transmission parameters, which can then be dynamically modified according to network conditions.

The transmission parameter modifier may be based on the received HARQ responses. This enables flexible and network-controlled modification of a transmission parameter.

The transmitted signal may comprise more than one demodulation reference signal per slot. This facilitates further increasing robustness using a grant-less PUSCH uplink.

There is also disclosed a user equipment for use in a cellular communications network, the user equipment comprising processing circuitry to: transmit a signal as a grant-less PUSCH uplink, wherein: the transmitted signal comprises more than one demodulation reference signal per slot.

By employing more than one demodulation reference signal per slot, the robustness of a grant-less PUSCH uplink is increased.

There is also disclosed a user equipment for use in a cellular communications network, the user equipment comprising processing circuitry to: transmit a signal as a grant-less PUSCH uplink based on one or more transmission parameters; receive HARQ responses; and modify one or more of the transmission parameters based on the received HARQ responses.

Modifying transmission parameters based on HARQ responses facilitates external, dynamic, network control over the transmission characteristics of the grant-less PUSCH uplink.

In the event that two or more consecutive HARQ responses are ACKs, one or more of the transmission parameters may be modified thereby to increase the transmission data rate; and/or in the event that two or more consecutive HARQ responses are NACKs, one or more transmission parameters may be modified thereby to increase transmission robustness.

This ensures facilitates maintenance of a sufficient robustness of the grant-less PUSCH uplink without expending excessive network resources, by creating a dynamic network feedback loop.

The sequence of the demodulation reference signal may be set based on the one or more transmission parameters. This provides a means through which the user equipment can signal the transmission parameter being employed to, for example, an eNB, without undue change of existing network infrastructure of specifications. For example, the demodulation reference signal may be modified in accordance with the one or more modified transmission parameters, helping the network to keep track of the present transmission parameters being employed.

The one or more transmission parameters may comprise Modulation and Coding Scheme (MCS), and optionally the MCS modified based on the received HARQ responses. The MCS is a critical factor in robustness and therefore facilitating its modification employing feedback can facilitate providing a robust grant-free PUSCH uplink without placing excessive burden on network resources.

The sequence of the demodulation reference signal may be set based on the MCS. This provides a means through which the currently employed MCS of the user equipment can be communicated to the network.

The processing circuitry may be configured to: transmit the signal as a grantless PUSCH uplink in response to a received control signal specifying that the UE is to transmit using a grant-less PUSCH uplink. This enables the network to control when low-latency PUSCH uplinks are provided.

The transmitted signal employs TTI bundling. This synergistically enhances transmission robustness in the case of a grant-free PUSCH uplink, by increasing the number of resources in time domain, which are used to transmit the packet of a given length. TTI bundling also increases the number of demodulation reference signals associated with an uplink transmission that can be used to improve the reliability of the MCS signaling to the network using demodulation reference signals.

The user may further comprise one or more of: a screen, a speaker, a touchscreen, a keyboard, an antenna array including a plurality of antennas, a graphics processor, an application processor.

There is also disclosed an eNB for use in a cellular communications network, the eNB comprising processing circuitry to: replace one or more UE transmission parameters from which a further UE transmission parameter may be determined by the UE with one or more corresponding virtual UE transmission parameters to provide one or more replacement UE transmission parameters from which a modified further UE transmission parameter may be determined; transmit the replacement UE transmission parameters to a UE; and receive a grant-less PUSCH transmission from a user equipment.

There is also disclosed an eNB for use in a cellular communications network, the eNB comprising processing circuitry to: transmit a control signal to a UE specifying that the UE is to transmit as a grant-less PUSCH uplink; and receive a grant-less PUSCH transmission from a user equipment, wherein: the transmitted control signal specifies that more than one demodulation reference signal per slot is to be employed by the UE in transmitting the PUSCH uplink.

There is also disclosed an eNB for use in a cellular communications network, the eNB comprising processing circuitry to: receive a grant-less PUSCH transmission signal from a user equipment; measure a characteristic of the received signal indicative of signal quality; and in the event that the measured characteristic is below a predetermined threshold, transmit to the user equipment a HARQ response that is a NACK.

This provides a means of signaling to the user equipment that a change of transmission parameter ought to be employed based on the measured characteristic of the received signal.

There is also disclosed a method of modifying a transmission parameter, the method comprising: replacing one or more transmission parameters from which a further transmission parameter may be determined with one or more corresponding virtual transmission parameters to provide one or more replacement transmission parameters from which a modified further transmission parameter may be determined; determining the modified further transmission parameter based on the one or more replacement transmission parameters; and transmitting a signal as a grant-less PUSCH uplink using the modified further transmission parameter.

There is also disclosed a method of performing a PUSCH uplink using a non-orthogonal multiple access transmission mode, the method comprising: transmitting a signal as a grant-less PUSCH uplink, wherein: the transmitted signal comprises more than one demodulation reference signal per slot.

There is also disclosed a method of performing a PUSCH uplink using a non-orthogonal multiple access transmission mode, the method comprising: transmitting a signal as a grant-less PUSCH uplink based on one or more transmission parameters; receiving HARQ responses; and modifying one or more of the transmission parameters based on the received HARQ responses.

There is also disclosed a non-transient computer readable medium comprising computer program instructions that when executed on a processor perform any of the above-described methods.

Figure 2:
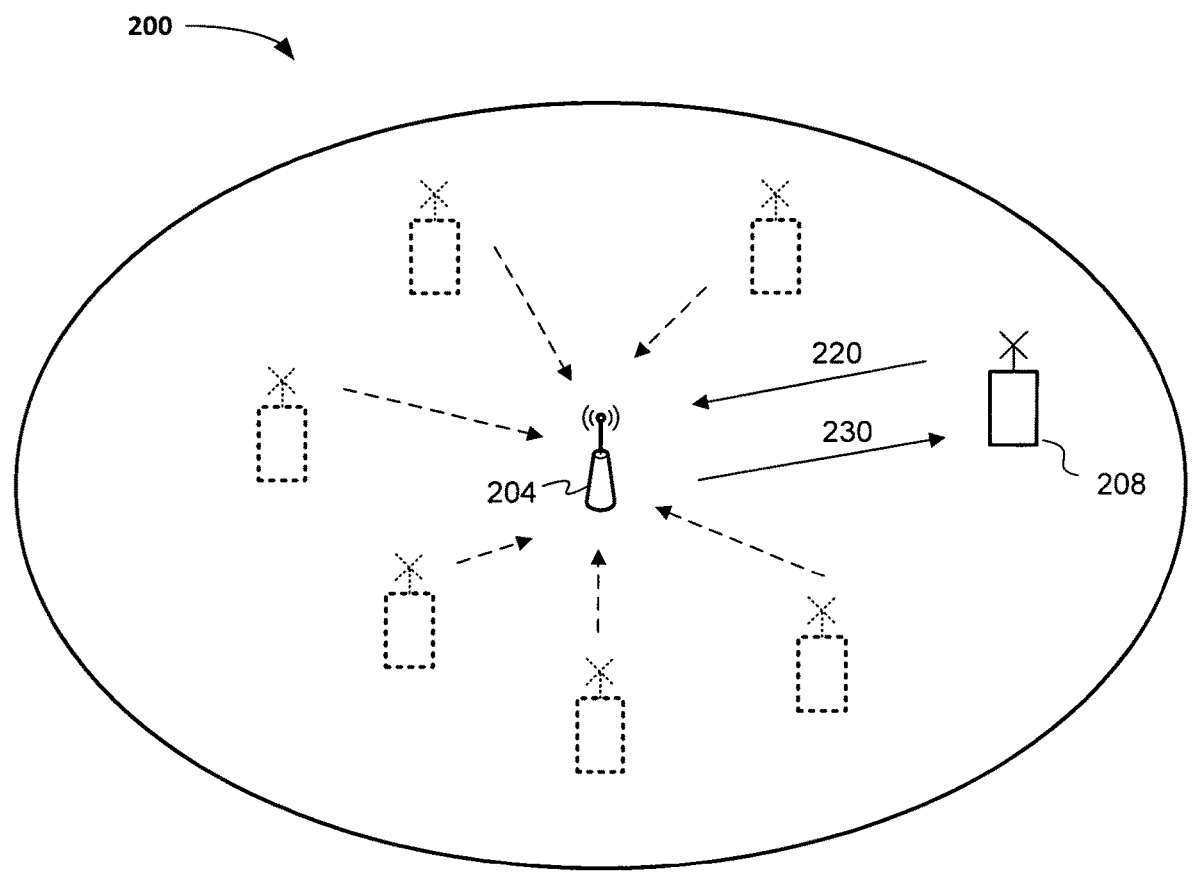
FIG. 2 shows an example of a cellular communications network in which multiple user equipment devices are in communication with an eNB.

FIGS. 1 and 2 schematically illustrate a cellular communications network 100, 200. The cellular communications network, hereafter network, may be an access network of a 3rd Generation Partnership Project (3GPP) long-term evolution (LTE) or long-term evolution-advanced (LTE-A) network such as an evolved universal mobile telecommunication system (UMTS) terrestrial radio access network (E-UTRAN).

The network 100 may include a base station, e.g., evolved node base station (eNB) 104, configured to wirelessly communicate with one or more mobile device(s) or terminal(s), e.g., user equipment (UE) 108. In various configurations, the eNB 104 may be a fixed station (e.g., a fixed node) or a mobile station/node.

The eNB 104 may include a receiver 120 with which to receive signals from UE 108 via one or more antennas 130. eNB 104 may include a transmitter 124 with which to transmit signals to UE 108 via one or more antennas 130. eNB 104 may also include a processor 128 in communication with receiver 120 and transmitter 124 and configured to encode and decode information communicated by the signals.

In various configurations, the UE 108 and/or the eNB 104 may include a plurality of antennas 156, 130 to implement a multiple-input-multiple-output (MIMO) transmission system, which may operate in a variety of MIMO modes, including single-user MIMO (SU-MIMO), multi-user MIMO (MU-MIMO), close loop MIMO, open loop MIMO or variations of smart antenna processing.

In various configurations, UE 108 comprises a transmitter 148 for transmitting signals to eNB 104 and a receiver 144 for receiving signals from the eNB 104. UE 108 further comprises a processor 152 coupled between a receiver 144 and a transmitter 148 and may include a communication interface 154 to encode and decode information communicated by the signals. Processor 152 may also include audio processor 158 to encode voice signals for transmission.

While the disclosed configurations are described with reference to an LTE network, the configurations may be used with other types of wireless access networks.

The configurations described herein may be used in a variety of applications including transmitters and receivers of a radio system, although the present invention is not limited in this respect. Radio systems specifically included within the scope of the present invention include, but are not limited to, network interface cards (NICs), network adaptors, fixed or mobile client devices, relays, base stations, femtocells, gateways, bridges, hubs, routers, access points, or other network devices. Further, the radio systems within the scope of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive configurations could be suitably applied.

FIG. 2 depicts a cellular communications network in which multiple UEs are in communication with an eNB 204, and the arrows are indicative of the UEs performing uplink transmissions to the eNB 204.

Figure 3:
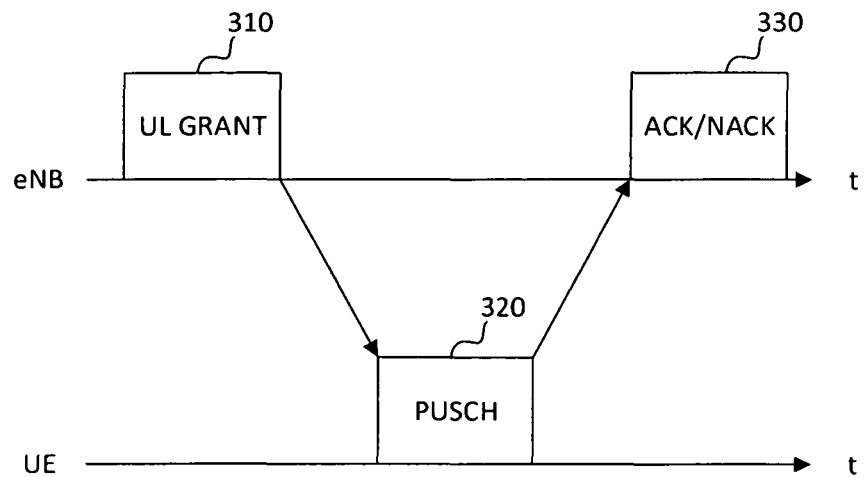
FIG. 3 shows a PUSCH uplink employing an uplink scheduling grant.
Figure 4:
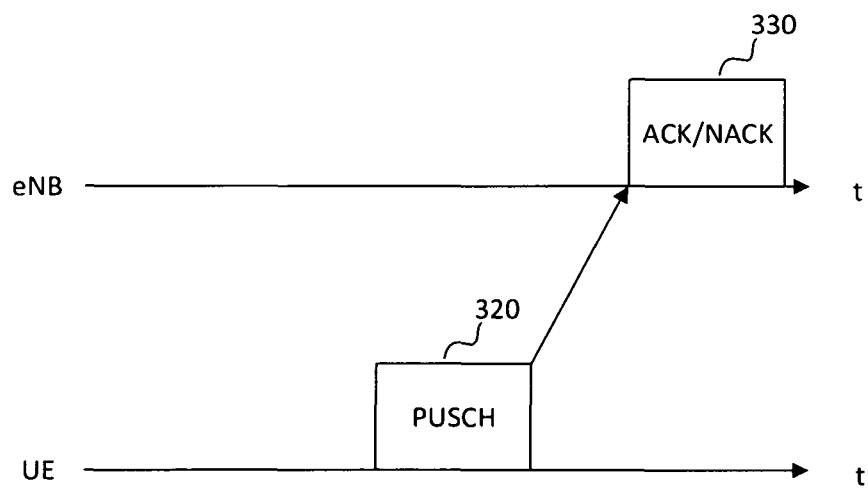
FIG. 4 shows a grant-less PUSCH uplink.

In the case of PUSCH uplinks, as depicted in FIG. 3 it is conventional for a UE to obtain an uplink scheduling grant 310 typically conveyed in the downlink over the physical downlink control channel (PDCCH) using downlink control information (DCI). The DCI contains information on the transport block size, modulation order, coding scheme, resource allocation (allocated resource blocks) and other parameters (e.g. precoding, power control, etc.) related to the uplink transmission.

A PUSCH uplink scheduling grant 310 grants permission for the UE to transmit and includes the transmission parameters that it should use, for example the transport block size, the resource block allocation and the modulation scheme.

The resource block allocation ensures that uplink PUSCH transmissions are orthogonal or non-overlapping with resource allocations of other UEs in the frequency domain, mitigating the potential for interference in the scenario depicted in FIG. 2, in which multiple UEs may simultaneously perform PUSCH uplinks.

Whilst in this way the prior communication of the PUSCH uplink scheduling grant 310 ensures that the subsequent PUSCH transmission will be contention free there is a latency introduced arising from the granting process.

After reception of the DCI on subframe n, the UE prepares and sends data in the n+k subframe using the PUSCH in accordance to the signaled parameters. The eNB decodes the PUSCH and provides the PUSCH reception status using acknowledgement/negative acknowledgement (ACK/NACK) responses in the subframe n+k+l using the physical hybrid automatic repeat request (HARQ), which may be communicated using for example the Physical Hybrid-ARQ Indicator Channel (PHICH). It can be seen that there is substantial latency occurring between the DCI transmission and ACK/NACK response from the eNB.

By omitting to obtain a PUSCH uplink scheduling grant 310, and nevertheless performing a PUSCH uplink 320, i.e. performing a grant-less PUSCH uplink, the latency associated with the PUSCH uplink can be significantly reduced.

But omitting the PUSCH uplink scheduling grant 310, whilst reducing uplink latency, results in the potential for non-orthogonal multiple access, since the interference-free resource allocation in the uplink scheduling grant 310 is no longer provided. For such grant-less PUSCH, a UE may be configured with pre-determined and semi-static uplink physical resources that it can use for transmission of the PUSCH. The procedure of the non-orthogonal multiple access is similar to contention free random access procedures of LTE, in which a UE is configured with a unique RAR sequence that it can use.

Accordingly, since the number of UEs attempting to transmit PUSCH on the same resources may be large and unpredictable, the transmission needs to be robust enough to provide satisfactory performance.

One possible approach for non-orthogonal multiplexing relies on the sequence spreading applied on top of single-carrier frequency-division multiple access (SC-FDMA), where each modulated symbol is spread by some sequence (e.g. Zadoff-Chu, DFT, Hadamard). This approach however introduces the drawback of significant additional processing complexity at the UE and eNB associated with spreading and de-spreading and may require complex design of the spreading sequences.

In order to render grant-less PUSCH uplink feasible then, there is disclosed mechanisms through which a grant-less PUSCH uplink can be made robust enough to achieve satisfactory performance despite the potential for non-orthogonal multiple access.

Examples of transmission parameters affecting channel robustness include: coding rate, modulation order and number of reference signals.

A channel coding approach may be utilized for non-orthogonal multiple access. The basic idea is to achieve spreading by using conventional channel coding procedures with lower coding rate than currently assumed for LTE-A. Due to higher interference levels experienced due to non-orthogonal multiplexing of the UEs, the non-orthogonal multiplexing using channel coding schemes may also employ more robust channel estimation performance by increasing the density of uplink (UL) demodulation reference signals (DM-RS). Finally, to enable link adaptation for such a non-orthogonal access scheme, a UE may be configured with the more than one modulating and coding schemes (MCS) that it can use for PUSCH transmission. The MCS may be associated with the DM-RS sequence to facilitate MCS detection at the eNB. The selection of the MCS at the UE may be based on the ACK/NACK reports provided by the eNB using PHICH channel. For example, if N1 consecutive ACKs are received by the UE, the MCS for PUSCH shall be increased and if N2 (>=1) consecutive NACKs are received by the UE, the MCS for PUSCH shall be decreased. The increasing and decreasing of MCS should be based on the set of configured MCS.

Figure 5:
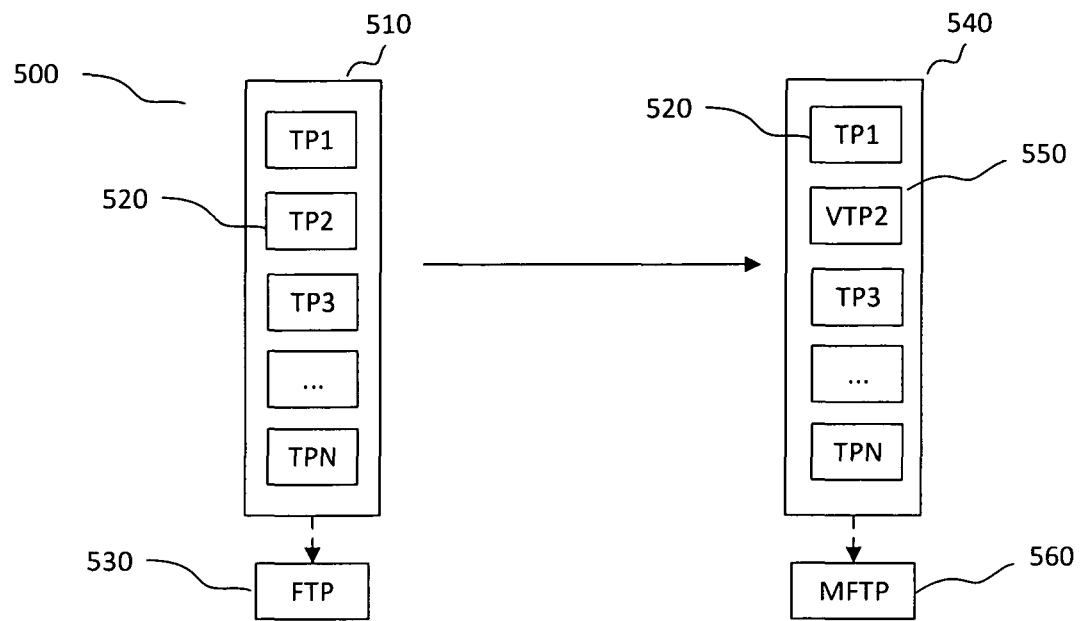
FIG. 5 shows an example of replacing a transmission parameter with a virtual transmission parameter.

One mechanism for improving transmission robustness will be described with reference to FIG. 5.

Under present LTE specifications, and with reference to 3GPP TS36.213 V12.7.0, a UE determines certain further transmission parameters from existing transmission parameters such as by performing table lookups based on the 3GPP specification.

For example, the transmission coding rate is not explicitly signalled to the UE and is instead determined from other parameters provided to the UE, e.g. via higher layer signalling, such as the modulation and coding scheme (MCS) and resource allocation. The MCS is used to derive the TBS index and modulation order. The TBS index and resource allocation size determined from the resource allocation are then used to determine the actual transport block size (TBS). In this way, the TBS and modulation order can be set based higher layer signalling using an MCS index parameter that can be set to a value between 0 and 31.

More specifically, the UE can determine the TBS from the MCS index $I_{MCS}$ parameter and a further parameter corresponding to the number of physical resource blocks $N_{PRB}$, which can also be provided by the DCI: using the $I_{MCS}$, see Table 8.6.1-1: Modulation, TBS index and redundancy version table for PUSCH of 3GPP TS36.213 V12.7.0, reproduced below, the modulation order and a TBS index $I_{TBS}$ can be obtained; and, finally, using $I_{TBS}$ and the $N_{PRB}$ in conjunction with the tables in Section 7.1.7.2 of 3GPP TS36.213 V12.7.0, the TBS can be determined.

The transmission coding rate is, in turn, determined based on the TBS.

A grant-less PUSCH uplink can be rendered more robust by modifying one or more of the grant-less PUSCH uplink transmission parameters. It is, however, desirable to modify them in such a way that does not require substantial change to existing network infrastructure and specifications.

TABLE

Modulation, TBS index and redundancy version table for PUSCH

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |

TABLE-continued

Modulation, TBS index and redundancy version table for PUSCH

| MCS Index $I_{MCS}$ | Modulation Order $Q_m'$ | TBS Index $I_{TBS}$ | Redundancy Version $rv_{idx}$ |
|---|---|---|---|
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

It is desirable to, for example, reduce the coding rate thereby to increase the transmission robustness, by employing a greater number of parity bits in the transmitted signal that may usefully be employed for error correction purposes.

Given that a UE determines certain further transmission parameters based on existing transmission parameters, it is possible to modify the determination of the further transmission parameter by replacing one of the existing transmission parameters with a corresponding virtual transmission parameter.

For example for grant-less PUSCH the parameters of the transmission can be set using higher layer signalling, such as the modulation and coding scheme (MCS) and resource allocation. The MCS is used to derive the TBS index ($I_{TBS}$) and modulation order. As explained above the TBS is determined based on $I_{TBS}$ and $N_{PRB}$. If the number of resource blocks $N_{PRB}$ is replaced with a virtual number of resource blocks $N_{PRB}$, say $N_{PRB}'$, different from the number of resource blocks $N_{PRB}$, in the determination of the TBS is based on $N_{PRB}'$, the determined TBS will be modified.

As an example, the following equation could be employed to determine the virtual number of resource blocks $N_{PRB}'$:

$$N_{PRB}' = \text{floor}(\alpha * N),$$

where floor rounds down to the nearest integer and $\alpha$ is a scaling factor less than one. The parameter $\alpha$ could be fixed or communicated to the UE using higher layer signaling.

Thus from the MCS index $I_{MCS}$, the modulation order and transport block size index $I_{TBS}$ can be determined from the table above. In turn, the $I_{TBS}$ value together with resource allocation size $N_{PRB}$ can be used by the UE to determine the transport block size using the tables specified in Section 7.1.7.2 of TS 36.213 v12.7.0. The typical coding rates supported vary between ½ to ⅚ depending on the modulation scheme. The lowest MCS=0 is provided for quadrature phase shift keying (QPSK) modulation with a coding rate of ~1/10.

Given that multiple UEs may simultaneously access the same time and frequency resources, the coding rate for the MCS is ideally more robust than is currently assumed in LTE-A MCS design. In accordance with a first configuration, in order to determine the transport block size for a given modulation and coding scheme (adapted to the UE), the UE may use a scaled down number of the resource blocks N by employing a scaling factor $\alpha$ (of less than 1), i.e. a virtual, replacement, number of resource blocks is determined from $N' = \text{floor}(\alpha * N)$, where 'floor' is the closest smaller integer, and this is employed in determining the TBS. The parameter '$\alpha$' may be fixed or may be configured for the UE using higher layer signaling.

In this way the UE can replace one or more transmission parameters with one or more virtual transmission parameters thereby to modify the determined further transmission parameter.

Turning once again to FIG. 5, a further transmission parameter (FTP) 530 is determined from one or more existing transmission parameters 510. In the example of FIG. 5 the transmission parameter (TP2) 520 is replaced with the virtual transmission parameter (VTP2) 550. This provides the replacement parameters 540, which includes the original transmission parameters and any replacement virtual transmission parameters. From the replacement parameters 540, a modified further transmission parameter (MFTP) 560 is determined.

This process can be employed in order to modify the transmission parameters utilised using a grant-less PUSCH uplink thereby to increase transmission robustness without requiring substantial change to existing network infrastructure or specifications.

Another way to improve transmission robustness of a grant-less PUSCH uplink is to employ additional demodulation reference signals (DM-RS) in the transmitted grant-less PUSCH uplink. More specifically, 4 or more DM-RS per subframe (two or more DM-RS per slot) may be employed.

Figure 6:
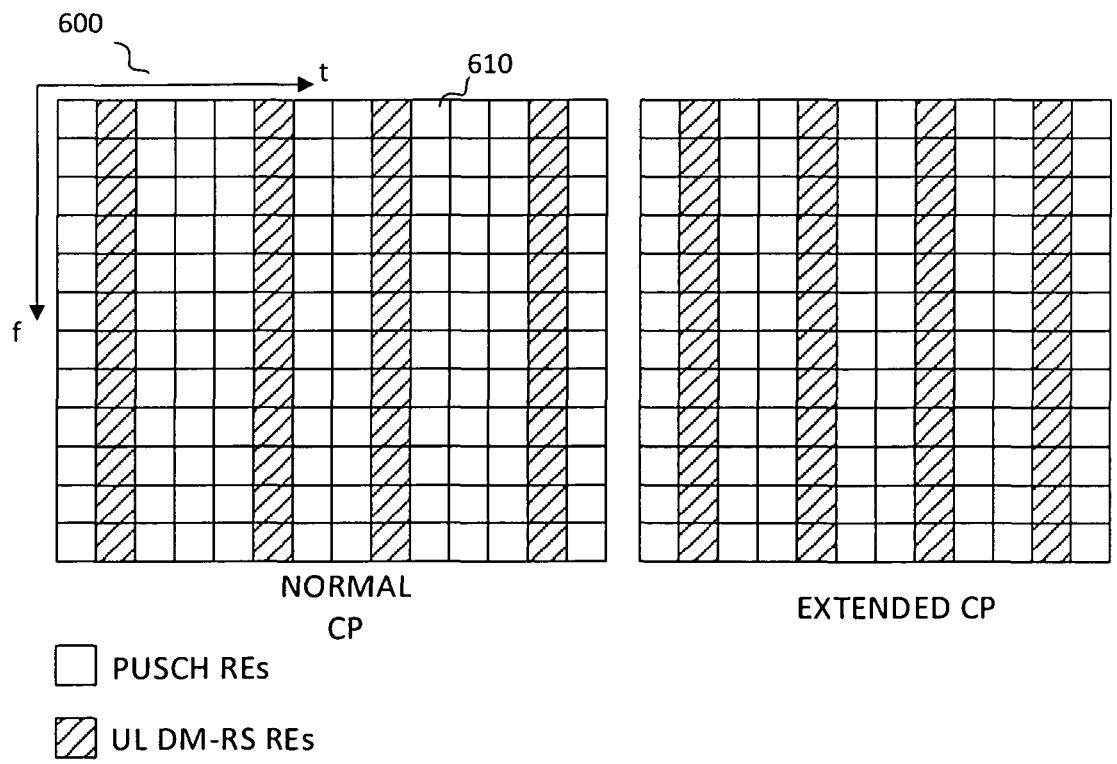
FIG. 6 shows an example of resource allocation for effecting a PUSCH uplink in which more than one DM-RS per slot is employed.

Examples of such a DM-RS arrangement for subframes with normal and extended cyclic prefix are shown in 600 of FIG. 6, in which the allocation of resource elements 610 across time and frequency for the grant-less PUSCH uplink is shown.

Increasing the number of demodulation reference signals employed in this way serves to increase transmission robustness of the grant-less PUSCH uplink, rendering it feasible.

Employing an additional DM-RS for each PUSCH uplink slot in this way synergistically interacts with the above-described technique for modifying one of the transmission parameters to be used in the PUSCH uplink, as the channel estimation performance, primarily determined by the number of the reference signals, should then be balanced with the channel coding performance of PUSCH.

Absent the DCI containing a PUSCH scheduling grant, conventional link adaption is not possible.

By modifying one or more of the PUSCH uplink transmission parameters based on the HARQ responses received from PUSCH uplinks, it is possible to nevertheless achieve link adaptation.

Turning to FIG. 2, when UE 208 transmits a grant-less PUSCH uplink 220, it receives a HARQ 230 from eNB 204. The UE may be configured to modify one or more transmission parameters based on the received HARQs, thereby to achieve link adaptation.

As an example, the UE may be configured to employ more than one possible MCS for the PUSCH transmission. Selection of the MCS may be performed using ACK/NACK responses from the eNB provided using the PHICH channel. For example if N1 consecutive ACKs are received by the UE, the MCS for PUSCH could be increased and if N2 (>=1) consecutive NACKs are received by the UE, the MCS for PUSCH could be reduced. The increasing and decreasing of MCS may be within the set of configured MCS.

By associating a specific DM-RS sequence with the one or more transmission parameters used in the grant-less PUSCH uplink, the one or more transmission parameters employed by the UE in performing the PUSCH uplink may be blindly detected. So for example, to facilitate blind detection of the MCS at the eNB, each MCS may be associated with a specific higher layer configured DM-RS sequence (e.g. root of Zadoff-Chu sequence).

The above-described configurations may be employed in conjunction with transmission time interval (TTI) bundling, in which the resource allocation may include multiple consecutive subframes aggregated in the time domain.

Figure 7:
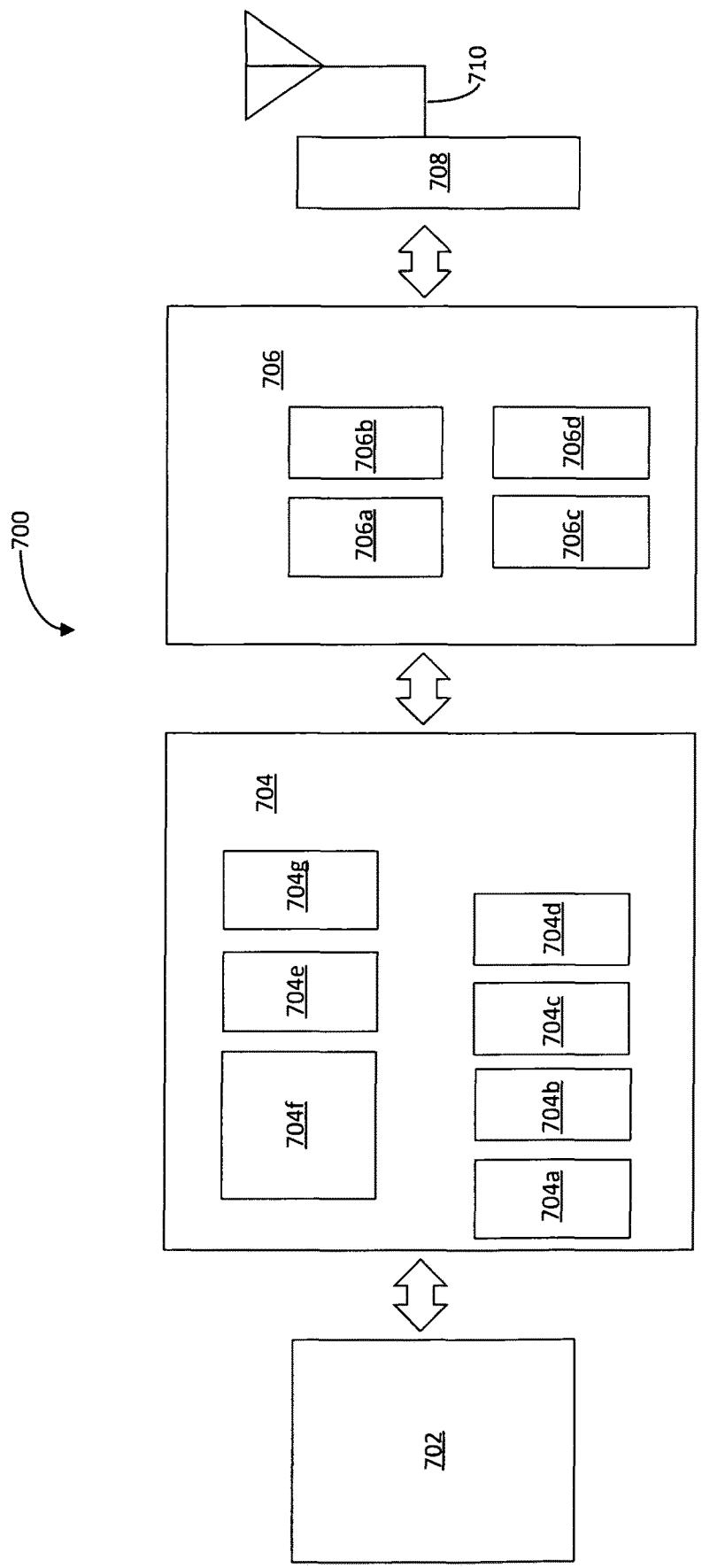
FIG. 7 shows an example system capable of implementing the configurations described herein.

Reference is now made to FIG. 7.

Configurations described herein may be implemented into a system using any suitably configured hardware and/or software. FIG. 7 illustrates, for one configuration, example components of an electronic device 700. In configurations, the electronic device 700 may be, implement, be incorporated into, or otherwise be a part of a user equipment (UE), an evolved NodeB (eNB), or both. In some configurations, the electronic device 700 may include application circuitry 702, baseband circuitry 704, Radio Frequency (RF) circuitry 706, front-end module (FEM) circuitry 708 and one or more antennas 710, coupled together at least as shown.

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuity 704 may interface with the application circuitry 702 for generation and processing of the baseband signals and for controlling operations of the RF circuitry 706. For example, in some configurations, the baseband circuitry 704 may include a second generation (2G) baseband processor 704a, third generation (3G) baseband processor 704b, fourth generation (4G) baseband processor 704c, and/or other baseband processor(s) 704d for other existing generations, generations in development or to be developed in the future (e.g., fifth generation (5G), 6G, etc.). The baseband circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, etc. In some configurations, modulation/demodulation circuitry of the baseband circuitry 704 may include Fast-Fourier Transform (FFT), precoding, and/or constellation mapping/demapping functionality. In some configurations, encoding/decoding circuitry of the baseband circuitry 704 may include convolution, tail-biting convolution, turbo, Viterbi, and/or Low Density Parity Check (LDPC) encoder/decoder functionality. Configurations of modulation/demodulation and encoder/decoder functionality are not limited to these examples and may include other suitable functionality in other configurations.

In some configurations, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704e of the baseband circuitry 704 may be configured to run elements of the protocol stack for signaling of the PHY, MAC, RLC, PDCP and/or RRC layers. In some configurations, the baseband circuitry may include one or more audio digital signal processor(s) (DSP) 704f. The audio DSP(s) 704f may be include elements for compression/decompression and echo cancellation and may include other suitable processing elements in other configurations.

The baseband circuitry 704 may further include memory/storage 704g. The memory/storage 704g may be used to load and store data and/or instructions for operations performed by the processors of the baseband circuitry 704. Memory/storage for one configuration may include any combination of suitable volatile memory and/or non-volatile memory. The memory/storage 704g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 704g may be shared among the various processors or dedicated to particular processors.

Components of the baseband circuitry may be suitably combined in a single chip, a single chipset, or disposed on a same circuit board in some configurations. In some configurations, some or all of the constituent components of the baseband circuitry 704 and the application circuitry 702 may be implemented together such as, for example, on a system on a chip (SOC).

In some configurations, the baseband circuitry 704 may provide for communication compatible with one or more radio technologies. For example, in some configurations, the baseband circuitry 704 may support communication with an evolved universal terrestrial radio access network (EUTRAN) and/or other wireless metropolitan area networks (WMAN), a wireless local area network (WLAN), a wireless personal area network (WPAN). Configurations in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various configurations, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some configurations, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some configurations, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some configurations, the output baseband signals may be zero-frequency baseband signals, although this is not a requirement. In some configurations, mixer circuitry 706a of the receive signal path may comprise passive mixers, although the scope of the configurations is not limited in this respect.

In some configurations, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the configurations is not limited in this respect.

In some configurations, the mixer circuitry 706a of the receive signal path and the mixer circuitry 706a of the transmit signal path may include two or more mixers and may be arranged for quadrature downconversion and/or upconversion respectively. In some configurations, the mixer circuitry 706a of the receive signal path and the mixer circuitry 706a of the transmit signal path may include two or more mixers and may be arranged for image rejection (e.g., Hartley image rejection). In some configurations, the mixer circuitry 706a of the receive signal path and the mixer circuitry 706a may be arranged for direct downconversion and/or direct upconversion, respectively. In some configurations, the mixer circuitry 706a of the receive signal path and the mixer circuitry 706a of the transmit signal path may be configured for super-heterodyne operation.

In some configurations, the output baseband signals and the input baseband signals may be analog baseband signals, although the scope of the configurations is not limited in this respect. In some alternate configurations, the output baseband signals and the input baseband signals may be digital baseband signals. In these alternate configurations, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode configurations, a separate radio IC circuitry may be provided for processing signals for each spectrum, although the scope of the configurations is not limited in this respect.

In some configurations, the synthesizer circuitry 706d may be a fractional-N synthesizer or a fractional N/N+1 synthesizer, although the scope of the configurations is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some configurations, the synthesizer circuitry 706d may be a fractional N/N+1 synthesizer.

In some configurations, frequency input may be provided by a voltage controlled oscillator (VCO), although that is not a requirement. Divider control input may be provided by either the baseband circuitry 704 or the applications processor 702 depending on the desired output frequency. In some configurations, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some configurations, the divider may be a dual modulus divider (DMD) and the phase accumulator may be a digital phase accumulator (DPA). In some configurations, the DMD may be configured to divide the input signal by either N or N+1 (e.g., based on a carry out) to provide a fractional division ratio. In some example configurations, the DLL may include a set of cascaded, tunable, delay elements, a phase detector, a charge pump and a D-type flip-flop. In these configurations, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some configurations, synthesizer circuitry 706d may be configured to generate a carrier frequency as the output frequency, while in other configurations, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some configurations, the output frequency may be a LO frequency (fLO). In some configurations, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710.

In some configurations, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710.

In some configurations, the electronic device 700 may include additional elements such as, for example, memory/storage, display, camera, sensor, and/or input/output (I/O) interface.

In some configurations, the electronic device 700 of FIG. 7 may be, implement, be incorporated into, or otherwise be a part of a UE. The UE may include RF circuitry 706 to receive acknowledgement signals from an eNB. The UE may further include baseband circuitry 704 to identify a pair of consecutive acknowledgement signals either from the received acknowledgement signals. The pair of consecutive acknowledgement signals may either both indicate positive acknowledgements or both indicate negative acknowledgements. The UE may modify a MCS for a PUSCH based on the identified pair of consecutive acknowledgement signals.

Figure 8:
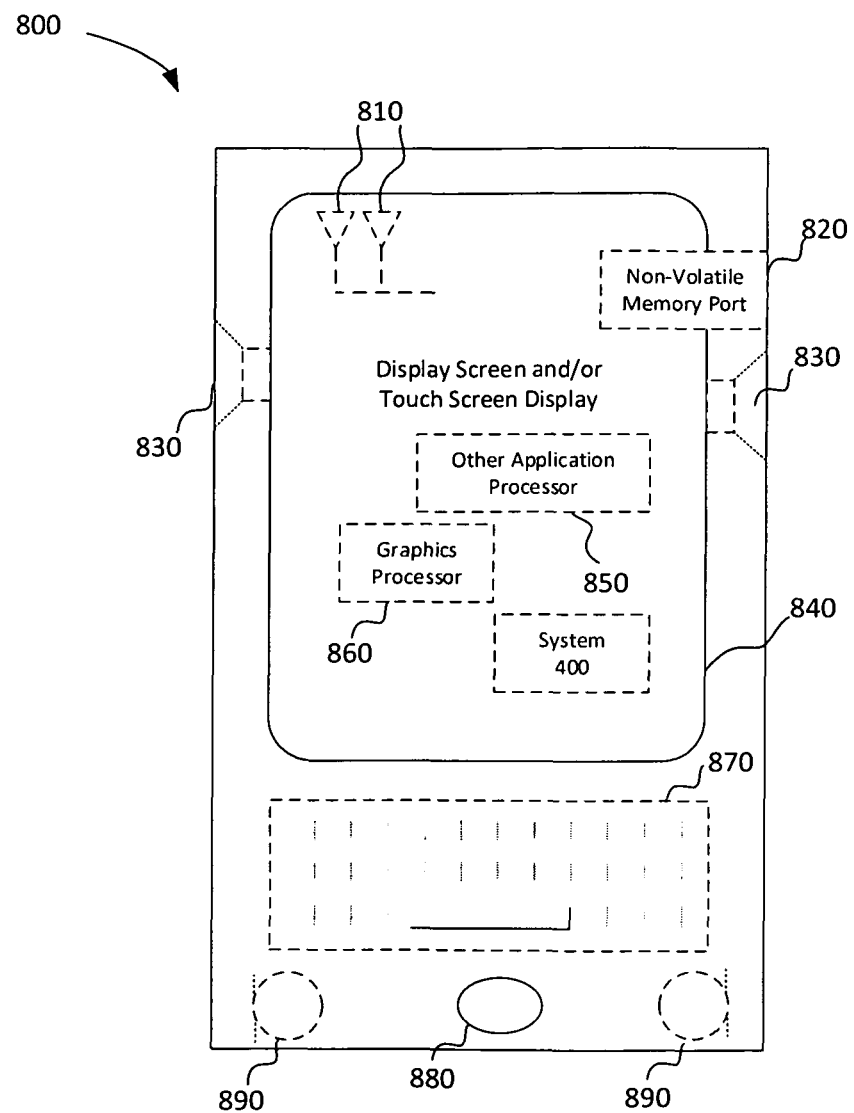
FIG. 8 shows an example wireless apparatus configured for communicating in a cellular communications network and capable of implementing the configurations described herein.

FIG. 8 shows a UE in the specific form of a mobile device 800, which may be implemented using system 700. In various configurations, user interfaces can include, but are not limited to, a display 840 (e.g. a liquid crystal display, a touch screen display, etc.), a speaker 830, a microphone 890, one or more cameras 880 (e.g. a still camera and/or video camera), a flashlight (e.g. a light emitting diode flash), and a keyboard 870.

In some configurations, the electronic device of FIG. 7 may include be, implement, be incorporated into, or otherwise be a part of an eNB. The eNB may include RF circuitry 706 to receive, from UE, a DM-RS sequence associated with a MCS for a PUSCH. The RF circuitry 706 may further transmit, to the UE, a first acknowledgement signal and a second acknowledgement signal, consecutive to the first acknowledgement signal. The eNB may further include baseband circuitry 704 to determine the MCS based on the DM-RS sequence. The baseband circuitry 704 may assign values to the first acknowledgement signal and the second acknowledgement signal based on the determined MCS.

The processor 152 of the UE 108 or processor 128 of the eNB 104 depicted in FIG. 1 may be configured to perform one or more processes, techniques, and/or methods as described herein, or portions thereof.

The electronic device of FIG. 7 may be configured to perform one or more processes, techniques, and/or methods as described herein, or portions thereof. Specifically, device 700 may comprise processing circuitry configured in this way. Such processing circuitry may be provided by the baseband circuitry 704. Instructions may be stored in the memory/storage 704g arranged to implement, when executed, one or more processes, techniques, and/or methods as described herein, or portions thereof.

Figure 9:
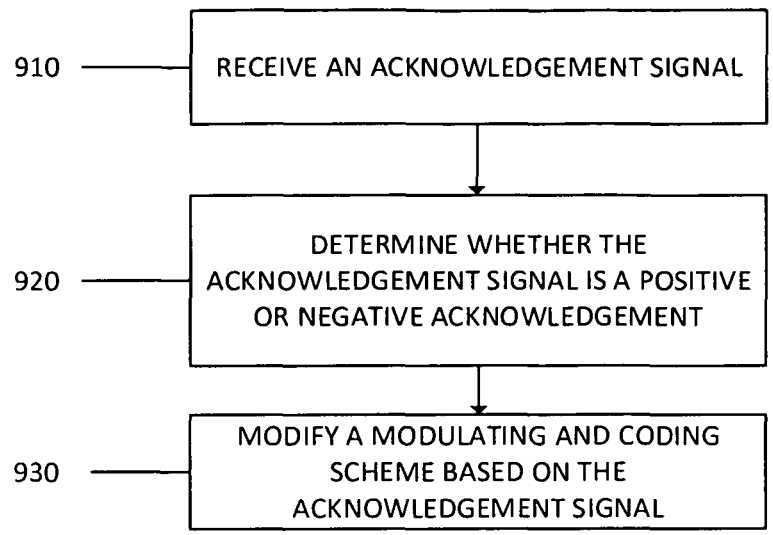
FIG. 9 shows an example method including modifying a modulating and coding scheme based on an acknowledgement signal.

One example of such a process is depicted in FIG. 9. For example, in configurations where the electronic device is, implements, is incorporated into, or is otherwise part of a UE or a portion thereof, the process may include a method, comprising receiving, by a UE, an acknowledgement signal from a eNB. The UE may determine whether the acknowledgement signal indicates a positive or negative acknowledgement and modify a MCS for PUSCH based on the determination of the acknowledgement signal.

Figure 10:
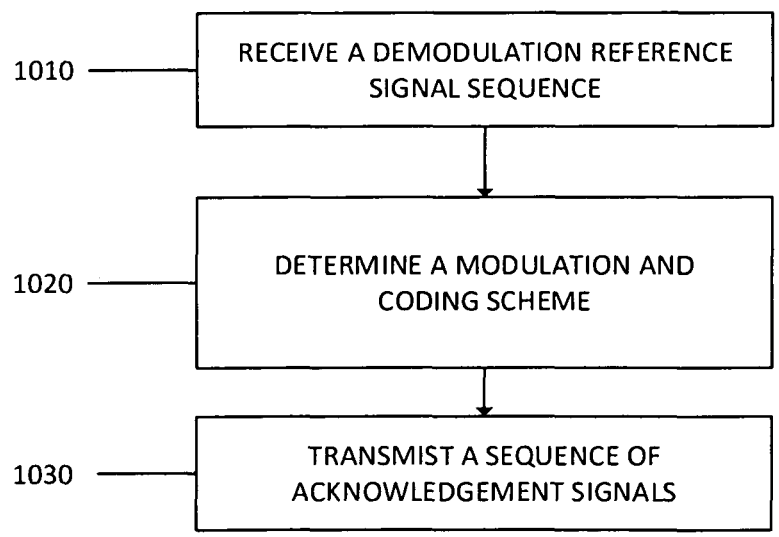
FIG. 10 shows an example method including transmitting a sequence of acknowledgement signals based on having determined a modulation and coding scheme from a received modulation reference signal sequence.

Another example of such a process is depicted in FIG. 10. For example, in configurations where the electronic device is, implements, is incorporated into, or is otherwise part of an eNB or a portion thereof, the process may include a method comprising receiving, the eNB, a DM-RS sequence from UE. The eNB may determine a MCS associated with PUSCH based on the DM-RS sequence and transmit a sequence of acknowledgement signals to the UE, wherein the sequence of acknowledgement signals instructs the UE to change the MCS.

Figure 11:
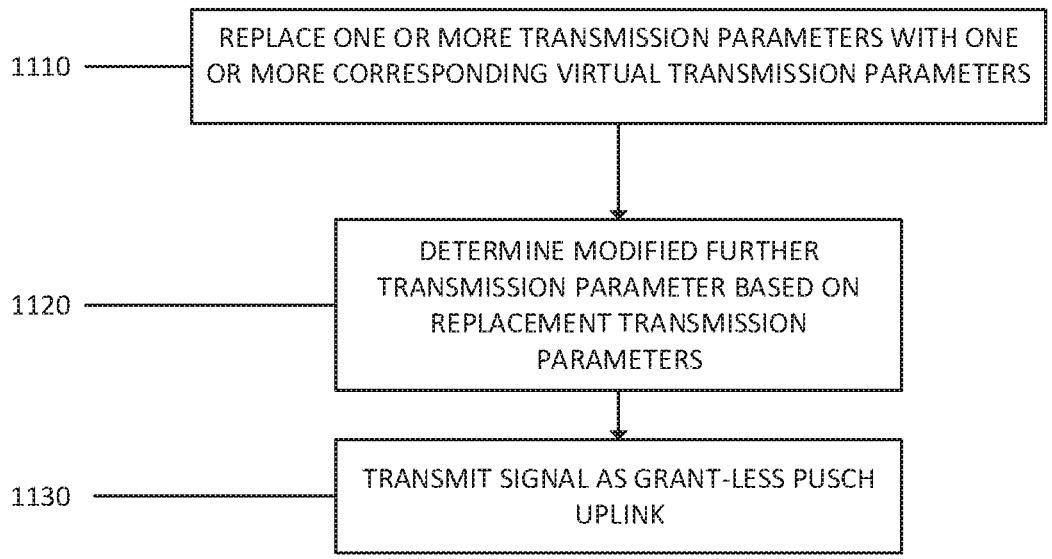
FIG. 11 shows an example of a method of transmitting a grant-less PUSCH uplink including replacing a transmission parameter with a virtual transmission parameter.
Figure 12:
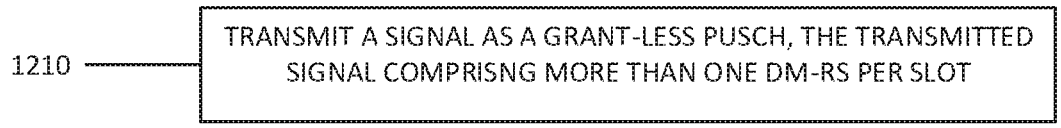
FIG. 12 shows an example of a method of transmitting a grant-less PUSCH uplink including employing more than one demodulation reference signal per slot.
Figure 13:
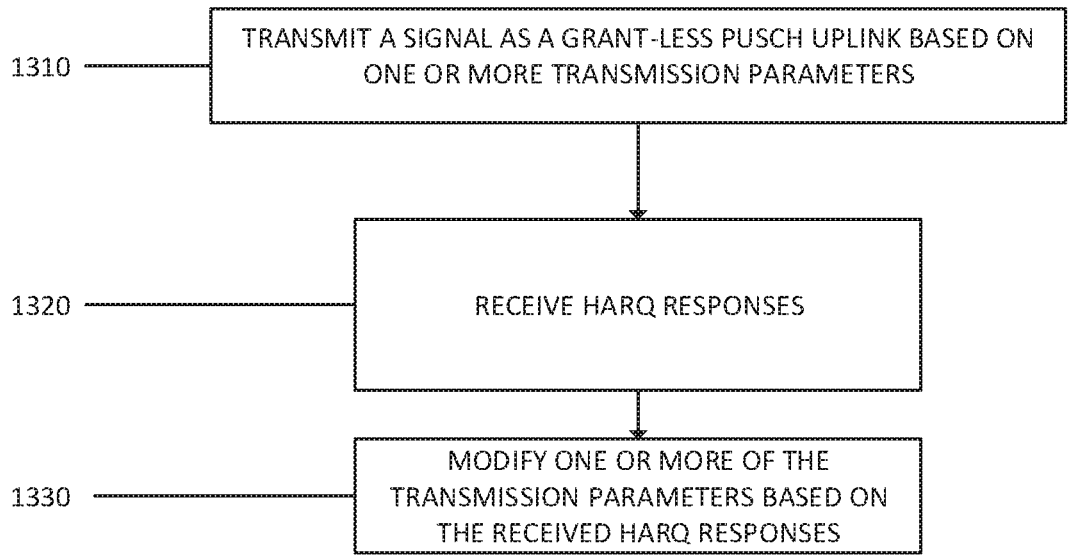
FIG. 13 shows an example of a method of transmitting a grant-less PUSCH uplink including modifying transmission parameters based on received HARQ responses.

Further examples of such processes are provided in FIGS. 11, 12 and 13.

FIG. 11 depicts a method of transmitting a grant-less PUSCH uplink in which one or more transmission parameters are replaced with one or more corresponding virtual transmission parameters 1110; a modified further transmission parameter is determined based on the replacement transmission parameters 1120; and the grant-less PUSCH signal is transmitted.

FIG. 12 depicts a method of transmitting a grant-less PUSCH uplink in which the transmitted signal comprises more than one DM-RS per slot 1210.

FIG. 13 depicts a method of transmitting a grant-less PUSCH uplink in which a signal is transmitted as a grant-less PUSCH uplink based on one or more transmission parameters 1310; HARQ responses are received 1320; and one or more of the transmission parameters are modified based on the received HARQ responses 1330.

Configurations may be realized according to the following examples.

Example 1 may include a method of the non-orthogonal multiple access scheme, wherein method includes: Higher layer configuration of the time and frequency resources for possible physical uplink shared channel (PUSCH) transmission; Higher layer configuration of one or more PUSCH transmission parameters that can be used by the user equipment (UE) for PUSCH transmission; The PUSCH transmission by the UE in accordance to the configured parameters in the configured resources without downlink control information (DCI) from the evolved Node-B (eNB); and Monitoring of the acknowledgement/negative acknowledgement (ACK/NACK) from the eNB corresponding to the PUSCH transmission.

Example 2 may include the method of example 1 or some other example herein, wherein higher layer configuration of time and frequency resources for possible PUSCH transmission includes periodicity, subframe offset and number of consecutive subframes.

Example 3 may include the method of example 1 or some other example herein, wherein higher layer configuration of one or more PUSCH transmission parameters includes at least one or more modulation and coding schemes (MCS) and one or more demodulation reference signal (DM-RS) sequences, wherein each DM-RS sequence may be associated with one MCS.

Example 4 may include the method of example 3 or some other example herein, wherein selection of the MCS is performed by the UE using acknowledgement/negative acknowledgement/discontinuous transmission (ACK/NACK/DTX) response received from the eNB in the physical hybrid automatic repeat request (HARQ) channel (PHICH) in response to PUSCH transmission.

Example 5 may include the method of example 4 or some other example herein, wherein if N1 consecutive ACKs are received by the UE, the MCS for PUSCH shall be increased and if N2 (>=1) consecutive NACK(s)/DTX(s) are received by the UE from the eNB, the MCS for PUSCH shall be decreased.

Example 6 may include the method of example 1 or some other example herein, wherein the configuration also includes configuration of uplink subframe with increased DM-RS density, where the number of DM-RS per subframe is more than 1.

Example 7 may include the method of example 1 or some other example herein, where in the transport block size (TBS) is determined by the UE assuming the number of resource blocks in the allocation is smaller than configured to the UE.

Example 8 may include the method of example 7 or some other example herein, the number of resource blocks for TBS is derived from N'=floor($\alpha$*N), where 'floor' is the closest smaller integer parameter '$\alpha$' may be fixed or configured for the UE using higher layer signaling.

Example 9 may include a method, comprising: receiving, by user equipment (UE), an acknowledgement signal from an evolved Node-B (eNB); determining, by the UE, whether the acknowledgement signal indicates a positive or negative acknowledgement; and modifying, by the UE, a modulation and coding scheme (MCS) related to a physical uplink shared channel (PUSCH) based on the determination of the acknowledgement signal.

Example 10 may include the method of example 9, or any other example herein, wherein, in response to determining that the acknowledgement signal indicates a positive acknowledgement, the UE increases the MCS for PUSCH.

Example 11 may include the method of example 9, or any other example herein, further comprising: receiving, by the UE, a second acknowledgement signal consecutive to the acknowledgement signal; and determining, by the UE, whether the second acknowledgement signal indicates a positive or negative acknowledgement, wherein modifying the MCS for PUSCH comprises increasing the MCS for PUSCH in response to determining that both the acknowledgement signal and the second acknowledgement signal indicate a positive acknowledgement.

Example 12 may include the method of example 9, or any other example herein, wherein, in response to determining that the acknowledgement signal indicates a negative acknowledgement, the UE decreases the MCS for PUSCH.

Example 13 may include the method of example 9, or any other example herein, further comprising: receiving, by the UE, a second acknowledgement signal consecutive to the acknowledgement signal; and determining, by the UE, whether the second acknowledgement signal indicates a positive or negative acknowledgement, wherein modifying the MCS for PUSCH comprises decreasing the MCS for PUSCH in response to determining that both the acknowledgement signal and the second acknowledgement signal indicate a negative acknowledgement.

Example 14 may include the method of example 9, or any other example herein, wherein the MCS includes a non-orthogonal multiple access coding approach.

Example 15 may include the method of example 9, or any other example herein, wherein the MCS utilizes sequence spreading applied on top of single-carrier frequency-division multiple access (SC-FDMA).

Example 16 may include the method of example 9, or any other example herein, wherein the MCS includes an increased density demodulation reference signal.

Example 17 may include the method of example 9, or any other example herein, further comprising determining, by the UE, a transport block size based on the MCS.

Example 18 may include the method of example 17, or any other example herein, wherein determining the transport block size is determined by a number of resource blocks.

Example 19 may include the method of example 9, or any other example herein, further comprising transmitting, by the UE, a demodulation reference signal (DM-RS) sequence to the eNB, wherein the DM-RS sequence indicates which MCS for PUSCH is being utilized.

Example 20 may include the method of example 19, or any other example herein, wherein the DM-RS sequence includes four DM-RS per subframe.

Example 21 may include user equipment (UE), comprising: radio frequency (RF) circuitry to: receive acknowledgement signals from an evolved Node-B (eNB); and baseband circuitry coupled with the RF circuitry, the baseband circuitry to: identify a pair of consecutive acknowledgement signals either from the received acknowledgement signals, wherein the pair of consecutive acknowledgement signals either both indicate positive acknowledgements or both indicate negative acknowledgements; and modify a modulation and coding scheme (MCS) for a physical uplink shared channel (PUSCH) based on the identified pair of consecutive acknowledgement signals.

Example 21 may include the UE of example 20, or any other example herein, wherein modifying the MCS for the PUSCH comprises increasing the MCS for the PUSCH if the identified pair of consecutive acknowledgement signals both indicate positive acknowledgements and decreasing the MCS for the PUSCH if the identified pair of consecutive acknowledgement signal both indicate negative acknowledgements.

Example 22 may include the UE of example 20, or any other example herein, wherein the baseband circuitry further includes assigning a transport block size based on the MCS.

Example 23 may include the UE of example 20, or any other example herein, wherein the baseband circuitry utilizes a non-orthogonal multiple access coding approach for the MCS.

Example 24 may include the UE of example 20, or any other example herein, wherein the baseband circuitry further includes performing sequence spreading on top of single-carrier frequency-division multiple access for the MCS.

Example 25 may include the UE of example 20, or any other example herein, wherein the baseband circuitry further includes increasing a density demodulation reference signal for the MCS.

Example 26 may include the UE of example 20, or any other example herein, wherein the RF circuitry further includes transmitting a demodulation reference signal (DM-RS) sequence associated with the MCS to the eNB.

Example 27 may include the UE of example 26, or any other example herein, wherein the transmission of the DM-RS sequence comprises transmitting four DM-RS per subframe.

Example 28 may include a method comprising: receiving, by an evolved Node-B (eNB), a demodulation reference signal (DM-RS) sequence from user equipment (UE); determining, by the eNB, a modulation and coding scheme (MCS) associated with a physical uplink shared channel (PUSCH) based on the DM-RS sequence; transmitting, by the eNB, a sequence of acknowledgement signals to the UE, wherein the sequence of acknowledgement signals instructs the UE to change the MCS.

Example 29 may include the method of example 28, or any other example herein, wherein the sequence of acknowledgement signals comprise at least two consecutive positive acknowledgement signals, and wherein the at least two consecutive positive acknowledgement signals instruct the UE to increase the MCS.

Example 30 may include the method of example 28, or any other example herein, wherein the sequence of acknowledgement signal comprise at least two consecutive negative acknowledgement signals, and wherein the at least two consecutive negative acknowledgement signals instruct the UE to decrease the MCS.

Example 31 may include an evolved Node-B (eNB) comprising: radio frequency (RF) circuitry to: receive, from user equipment (UE), a demodulation reference signal (DM-RS) sequence associated with a modulating and coding scheme (MCS) for a physical uplink shared channel (PUSCH); and transmit, to the UE, a first acknowledgement signal and a second acknowledgement signal, consecutive to the first acknowledgement signal; and baseband circuitry coupled with the RF circuitry, the baseband circuitry to: determine the MCS based on the DM-RS sequence; and assign values to the first acknowledgement signal and the second acknowledgement signal based on the determined MCS.

Example 32 may include the method of example 31, or any other example herein, wherein the baseband circuitry assigns both the first acknowledgement signal and the second acknowledgement signal a value associated with a positive acknowledgement, wherein the first acknowledgement signal and the second acknowledgement signal being assigned the value associated with the positive acknowledgement indicates the MCS is to be increased by the UE.

Example 33 may include the method of example 31, or any other example herein, wherein the baseband circuitry assigns both the first acknowledgement signal and the second acknowledgement signal a value associated with a negative acknowledgement, wherein the first acknowledgement signal and the second acknowledgement signal being assigned the value associated with the negative acknowledgement indicates the MCS is to be decreased by the UE.

Example 34 may include an apparatus comprising means to perform one or more elements of a method described in or related to any of examples 1-33, or any other method or process described herein.

Example 35 may include one or more non-transitory computer-readable media comprising instructions to cause an electronic device, upon execution of the instructions by one or more processors of the electronic device, to perform one or more elements of a method described in or related to any of examples 1-33, or any other method or process described herein.

Example 36 may include an apparatus comprising logic, modules, and/or circuitry to perform one or more elements of a method described in or related to any of examples 1-33, or any other method or process described herein.

Example 37 may include a method, technique, or process as described in or related to any of examples 1-33, or portions or parts thereof.

Example 38 may include a method of communicating in a wireless network as shown and described herein.

Example 39 may include a system for providing wireless communication as shown and described herein.

Example 40 may include a device for providing wireless communication as shown and described herein.

Configurations may be realized according to the following clauses.

1. A user equipment for use in a cellular communications network, the user equipment comprising circuitry to:
  replace one or more transmission parameters from which a further transmission parameter may be determined with one or more corresponding virtual transmission parameters to provide one or more replacement transmission parameters from which a modified further transmission parameter may be determined;
  determine the modified further transmission parameter based on the one or more replacement transmission parameters; and
  transmit a signal as a grant-less Physical Uplink Shared Channel (PUSCH) uplink using the modified further transmission parameter.

2. The user equipment according to clause 1, wherein:
  the further transmission parameter is transmission coding rate.

3. The user equipment according clause 2, wherein:
  the transmission coding rate is determined based on a transmission block size, which is in turn determined from the one or more replacement transmission parameters.

4. The user equipment according to any preceding clause, wherein:
  the one or more virtual transmission parameters are determined by adding and/or multiplying one or more of the transmission parameters and one or more transmission parameter modifiers.

5. The user equipment according to any preceding clause, wherein:
  one of the one or more transmission parameters is the number of resource blocks; and
  the corresponding virtual parameter is a virtual number of resource blocks.

6. The user equipment according to clause 5, wherein:
  the virtual number of resource blocks is determined by taking the product of the number of resource blocks and a resource blocks multiplier and rounding to the nearest integer.

7. The user equipment according to any preceding clause, wherein:
  more than one transmission parameter is replaced.

8. The user equipment according to any preceding clause, the circuitry to:
  receive a control signal; and
  decode from the received control signal the one or more transmission parameters.

9. The user equipment according to any preceding clause, the circuitry to:
  receive Hybrid Automatic Repeat Request (HARQ) responses, wherein:
  the one or more of the virtual transmission parameters are determined based on the received HARQ responses.

10. The user equipment according to clause 9 as dependent on clause 4, wherein:
  the transmission parameter modifier is based on the received HARQ responses.

11. The user equipment according to any preceding clause, wherein:
  the transmitted signal comprises more than one demodulation reference signal per slot.

12. A user equipment for use in a cellular communications network, the user equipment comprising circuitry to:
  transmit a signal as a grant-less Physical Uplink Shared Channel (PUSCH) uplink, wherein:
  the transmitted signal comprises more than one demodulation reference signal per slot.

13. A user equipment for use in a cellular communications network, the user equipment comprising circuitry to:
  transmit a signal as a grant-less Physical Uplink Shared Channel (PUSCH) uplink based on one or more transmission parameters;
  receive Hybrid Automatic Repeat Request (HARQ) responses; and
  modify one or more of the transmission parameters based on the received HARQ responses.

14. The user equipment according to clause 13, wherein:
  in the event that two or more consecutive HARQ responses are ACKs, modifying one or more of the transmission parameters thereby to reduce transmission robustness; and/or
  in the event that two or more consecutive HARQ responses are NACKs, modifying one or more transmission parameters thereby to increase transmission robustness.

15. The user equipment according to any one of clauses 12 to 14, wherein:
  the sequence of one or more demodulation reference signals employed in the transmitted signal is set based on one or more transmission parameters.

16. The user equipment according to any one of clauses 12 to 15, wherein:

one or more transmission parameters comprises Modulation and Coding Scheme (MCS).

17. The user equipment according to clause 16, wherein:
the sequence of a demodulation reference signal is set based on the MCS.

18. The user equipment according to any preceding clause, the circuitry to:
transmit the signal as a grant-less PUSCH uplink in response to a received control signal specifying that the UE is to transmit using a grant-less PUSCH uplink.

19. The user equipment according to any preceding clause, wherein:
the transmitted signal employs Transmission Time Interval (TTI) bundling.

20. The user equipment according to any preceding clause, further comprising one or more of:
a screen, a speaker, a touchscreen, a keyboard, an antenna array including a plurality of antennas, a graphics processor, an application processor.

21. An Evolved Node B (eNB) for use in a cellular communications network, the eNB comprising circuitry to:
replace one or more User Equipment (UE) transmission parameters from which a further transmission parameter may be determined by the UE with one or more corresponding virtual UE transmission parameters to provide one or more replacement UE transmission parameters from which a modified further UE transmission parameter may be determined;
transmit the replacement UE transmission parameters to a UE; and
receive a grant-less Physical Uplink Shared Channel (PUSCH) transmission from a user equipment.

22. An Evolved Node B (eNB) for use in a cellular communications network, the eNB comprising circuitry to:
transmit a control signal to a User Equipment (UE) specifying that the UE is to transmit as a grant-less Physical Uplink Shared Channel (PUSCH) uplink; and
receive a grant-less PUSCH transmission from a user equipment, wherein:
the transmitted control signal specifies that more than one demodulation reference signal per slot is to be employed by the User Equipment (UE) in transmitting the PUSCH uplink.

23. An Evolved Node B (eNB) for use in a cellular communications network, the eNB comprising circuitry to:
receive a grant-less Physical Uplink Shared Channel (PUSCH) transmission signal from a user equipment;
measure a characteristic of the received signal indicative of signal quality; and
in the event that the measured characteristic is below a predetermined threshold, transmit to the user equipment a Hybrid Automatic Repeat Request (HARQ) response that is a Negative Acknowledgement (NACK).

24. An Evolved Node B (eNB) according to any one of clauses 21 to 23, wherein:
the transmission signal comprises Transmission Time Interval (TTI) bundling.

25. A method of modifying a transmission parameter, the method comprising:
replacing one or more transmission parameters from which a further transmission parameter may be determined with one or more corresponding virtual transmission parameters to provide one or more replacement transmission parameters from which a modified further transmission parameter may be determined;
determining the modified further transmission parameter based on the one or more replacement transmission parameters; and
transmitting a signal as a grant-less Physical Uplink Shared Channel (PUSCH) uplink using the modified further transmission parameter.

26. A method of performing a Physical Uplink Shared Channel (PUSCH) uplink using a non-orthogonal multiple access transmission mode, the method comprising:
transmitting a signal as a grant-less PUSCH uplink, wherein:
the transmitted signal comprises more than one demodulation reference signal per slot.

27. A method of performing a Physical Uplink Shared Channel (PUSCH) uplink using a non-orthogonal multiple access transmission mode, the method comprising:
transmitting a signal as a grant-less PUSCH uplink based on one or more transmission parameters;
receiving Hybrid Automatic Repeat Request (HARQ) responses; and
modifying one or more of the transmission parameters based on the received HARQ responses.

28. A computer readable medium comprising computer program instructions that when executed on a processor perform the method according to any one of clauses 25 to 27.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

What is claimed is:

1. One or more non-transitory, computer-readable media having instructions that, when executed, cause a user equipment ("UE") to:
replace one or more transmission parameters from which a further transmission parameter may be determined with one or more corresponding virtual transmission parameters to provide one or more replacement transmission parameters from which a modified further transmission parameter may be determined;
determine the modified further transmission parameter based on the one or more replacement transmission parameters; and
transmit a signal as a grant-less Physical Uplink Shared Channel (PUSCH) uplink using the modified further transmission parameter.

2. The one or more non-transitory, computer-readable media according to claim 1, wherein:
the further transmission parameter is transmission coding rate.

3. The one or more non-transitory, computer-readable media according to claim 2, wherein:
the transmission coding rate is determined based on a transmission block size, which is in turn determined from the one or more replacement transmission parameters.

4. The one or more non-transitory, computer-readable media according to claim 1, wherein:
the one or more virtual transmission parameters are determined by adding and/or multiplying one or more of the transmission parameters and one or more transmission parameter modifiers.

5. The one or more non-transitory, computer-readable media according to claim 1, wherein:

one of the one or more transmission parameters is a number of resource blocks; and the corresponding virtual transmission parameter is a virtual number of resource blocks.

6. The one or more non-transitory, computer-readable media according to claim 5, wherein:

the virtual number of resource blocks is determined by taking the product of the number of resource blocks and a resource blocks multiplier and rounding to the nearest integer.

7. The one or more non-transitory, computer-readable media according to claim 1, wherein:

more than one transmission parameter is replaced.

8. The one or more non-transitory, computer-readable media according to claim 1, wherein the instructions, when executed, further cause the UE to:

receive a control signal; and decode from the received control signal the one or more transmission parameters.

9. The one or more non-transitory, computer-readable media according to claim 1, wherein the instructions, when executed, further cause the UE to:

receive Hybrid Automatic Repeat Request (HARQ) responses, wherein:

the one or more of the virtual transmission parameters are determined based on the received HARQ responses.

10. The one or more non-transitory, computer-readable media according to claim 9, wherein:

the one or more virtual transmission parameters are determined by adding and/or multiplying one or more of the transmission parameters and one or more transmission parameter modifiers; and the transmission parameter modifier is based on the received HARQ responses.

11. The one or more non-transitory, computer-readable media according to claim 1, wherein:

the transmitted signal comprises more than one demodulation reference signal per slot.

12. A user equipment for use in a cellular communications network, the user equipment comprising:

means to transmit a signal as a grant-less Physical Uplink Shared Channel (PUSCH) uplink based on one or more transmission parameters and in response to a received control signal specifying that the UE is to transmit using a grant-less PUSCH uplink;

means to receive Hybrid Automatic Repeat Request (HARQ) responses; and means to modify one or more of the transmission parameters based on the received HARQ responses.

13. The user equipment according to claim 12, wherein:

in the event that two or more consecutive HARQ responses are ACKs, modifying one or more of the transmission parameters thereby to reduce transmission robustness; and/or in the event that two or more consecutive HARQ responses are NACKs, modifying one or more transmission parameters thereby to increase transmission robustness.

14. The user equipment according to claim 12, wherein:

a sequence of a demodulation reference signal is set based on the one or more transmission parameters.

15. The user equipment according to claim 14, wherein:

the one or more transmission parameters comprises a Modulation and Coding Scheme (MCS).

16. The user equipment according to claim 15, wherein:

a sequence of the demodulation reference signal is set based on the MCS.

17. The user equipment according to claim 12, wherein:

the transmitted signal employs Transmission Time Interval (TTI) bundling.

18. The user equipment according to claim 12, further comprising one or more of:

a screen, a speaker, a touchscreen, a keyboard, an antenna array including a plurality of antennas, a graphics processor, an application processor.

19. One or more non-transitory, computer-readable media having instructions, that when executed, cause an Evolved Node B (eNB) to:

send a control signal to a user equipment (UE) to instruct the UE to transmit using a grant-less Physical Uplink Shared Channel;

receive a grant-less PUSCH transmission signal from the UE;

measure a characteristic of the received signal indicative of signal quality; and in the event that the measured characteristic is below a predetermined threshold, transmit to the user equipment a Hybrid Automatic Repeat Request (HARQ) response that is a Negative Acknowledgement (NACK).

20. The one or more non-transitory, computer-readable media according to claim 19, wherein:

the transmission signal comprises Transmission Time Interval (TTI) bundling.

* * * * *